No. 786,664. PATENTED APR. 4, 1905.
W. B. McCULLOUGH.
NUT LOCK.
APPLICATION FILED OCT. 22, 1904.

Witnesses
E. F. Stewart
C. N. Woodward

William B. McCullough,
Inventor.
by C. A. Snow & Co.
Attorneys

No. 786,664. Patented April 4, 1905.

UNITED STATES PATENT OFFICE.

WILLIAM B. McCULLOUGH, OF MONMOUTH, IOWA.

NUT-LOCK.

SPECIFICATION forming part of Letters Patent No. 786,664, dated April 4, 1905.

Application filed October 22, 1904. Serial No. 229,593.

*To all whom it may concern:*

Be it known that I, WILLIAM B. McCULLOUGH, a citizen of the United States, residing at Monmouth, in the county of Jackson and State of Iowa, have invented a new and useful Nut-Lock, of which the following is a specification.

This invention relates to nut-locks, and has for its object to produce a simply-constructed device which will effectually lock the nut to the bolt and prevent backward movement of the same, while at the same time serving as a washer between the nut and the body upon which it bears.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

Figure 1:
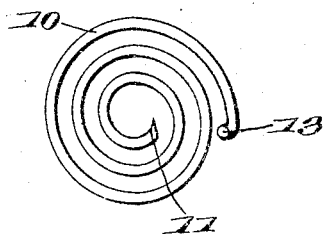
Figure 3:
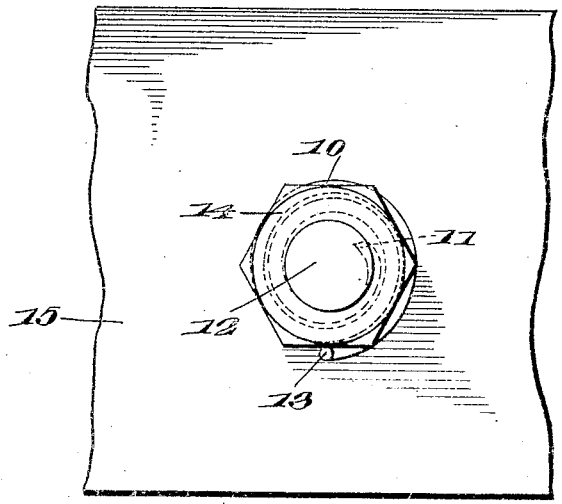
Figure 2:
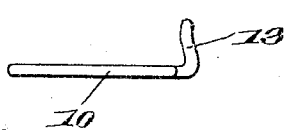
Figure 4:
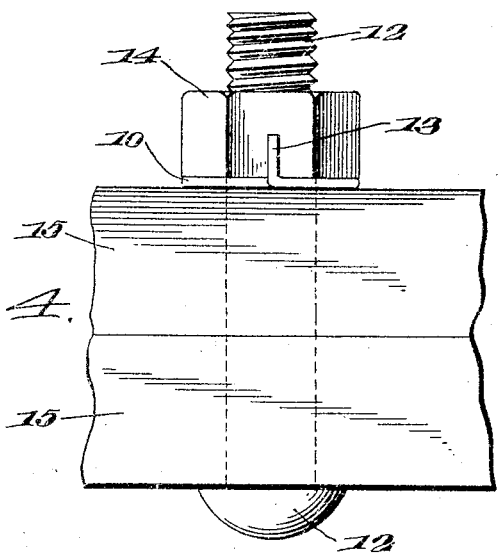

In the drawings thus employed, Figure 1 is a plan view, and Fig. 2 is a side view, of the improved device. Fig. 3 is a plan view. Fig. 4 is a side view of a bolt and nut with the improved locking device applied.

The improved device comprises a spiral 10, of resilient wire, preferably spring-steel, with the inner end 11 sharpened or chisel-pointed to cut the threads of the bolt 12 at an angle and with the outer end 13 bent at an angle to the plane of the spiral and formed on a compound curve for bearing against one of the faces of the nut 14 when the latter is in position upon the bolt.

In applying the device after the bolt 12 is inserted through the body 15, which it is designed to support, the locking-spiral is placed over the threaded end and rotated thereon, with the effect of causing the pointed end 11 to enter between the threads and follow the same, as the spiral is rotated in the same direction as the nut when being screwed upon the bolt and preferably curving inwardly. It will be noted that the sharpened end 11 engages the threads and follow the same when moved in one direction and will dig or bite into the softer metal of the bolt when attempt is made to rotate it in the opposite direction and effectually prevent retrograde movement. The locking device will be rotated until its coils bear against the supporting-body. The nut 14 will then be applied and turned home, the outturned end 13 yielding as the corners of the nut consecutively engage it until finally, as the nut is tightly screwed against the locking device, the end 13 bears against one of the faces of the nut and effectually locks it in position against any pressure to which it would be subjected while in use, while at the same time the outturned end will yield to any lateral force applied to displace it when the nut is to be removed.

The device is very simple in construction, inexpensive to manufacture and can be made in all sizes desired and will operate upon all sizes of bolts and nuts.

The wire employed may be of any required gage and of any suitable metal and when in position will serve as a washer between the nut 14 and the body member 15.

By curving the bent end 13 inwardly, as shown in Fig. 2, it bears with greater force against the nut, and thus increases the grip thereon and prevents any tendency to work loose.

Having thus described the invention, what is claimed is—

As a new article of manufacture, a nut-lock comprising a flat spiral of resilient wire having its inner end chisel-pointed to bite into the metal of a bolt and its outer end bent at an angle to the plane of the spiral and on a compound curve, thereby to insure proper contact between the angular portion and the face of the nut.

In testimony that I claim the foregoing as my own I have hereto affixed my signature in the presence of two witnesses.

WILLIAM B. McCULLOUGH.

Witnesses:
RALPH M. BERKLEY,
F. M. ALDEN.